United States Patent
Bae et al.

(10) Patent No.: US 7,317,711 B2
(45) Date of Patent: Jan. 8, 2008

(54) METHOD OF CONTROLLING REVERSE TRANSMISSION IN A MOBILE COMMUNICATION SYSTEM

(75) Inventors: Beom-Sik Bae, Taejon-Kwangyokshi (KR); Dong-Seek Park, Suwon-shi (KR); Chang-Hoi Koo, Songnam-shi (KR); Dae-Gyun Kim, Taegu-Kwangyokshi (KR)

(73) Assignee: Samsung Electronics Co., Ltd. (KR)

( * ) Notice: Subject to any disclaimer, the term of this patent is extended or adjusted under 35 U.S.C. 154(b) by 683 days.

(21) Appl. No.: 10/107,277

(22) Filed: Mar. 26, 2002

(65) Prior Publication Data

US 2003/0073443 A1    Apr. 17, 2003

(30) Foreign Application Priority Data

Mar. 26, 2001  (KR)  ............... 2001-15785
May 4, 2001    (KR)  ............... 2001-25348

(51) Int. Cl.
*H04B 7/216*    (2006.01)
(52) U.S. Cl. .................. 370/335; 370/478; 455/69; 455/522
(58) Field of Classification Search .......... 370/335, 370/478; 375/130, 147, 134, 356; 455/69, 455/522
See application file for complete search history.

(56) References Cited

U.S. PATENT DOCUMENTS

| | | | |
|---|---|---|---|
| 5,734,967 A * | 3/1998 | Kotzin et al. | 455/63.1 |
| 5,923,650 A | 7/1999 | Chen et al. | |
| 6,366,609 B1 * | 4/2002 | Rossi | 375/222 |
| 6,397,043 B1 * | 5/2002 | Kang | 455/69 |
| 6,735,185 B1 * | 5/2004 | Noneman | 370/335 |
| 2001/0015963 A1 | 8/2001 | Tuomainen et al. | |
| 2004/0190600 A1 * | 9/2004 | Odenwalder | 375/147 |
| 2005/0117519 A1 * | 6/2005 | Kwak et al. | 370/236 |

FOREIGN PATENT DOCUMENTS

| | | |
|---|---|---|
| EP | 1 043 902 | 10/2000 |
| WO | WO 98/36605 | 8/1998 |
| WO | WO 98/37668 | 8/1998 |
| WO | WO 00/14900 | 3/2000 |
| WO | WO 00/16576 | 3/2000 |

OTHER PUBLICATIONS

International Search Report dated May 16, 2002 for International Appln. No. PCT/KR02/00514.
Seong-Jun Oh et al., HDR (1xEV-DO) Reverse Link Throughput with Fast Rate Control, Wireless Communications and Networking Conference, Mar. 17, 2002.

* cited by examiner

*Primary Examiner*—Jean Gelin
*Assistant Examiner*—Inder Pal Mehra
(74) *Attorney, Agent, or Firm*—The Farrell Law Firm, P.C.

(57) ABSTRACT

A reverse transmission controlling method in a mobile communication system, after receiving forward information, commanding the increase or decrease of the reverse data rate received on a forward control channel from a base station, a mobile station determines whether the previous rate increase available information transmitted to the base station on a reverse control channel before reception of the forward information indicates that a reverse data rate increase is available, if the forward information commands a reverse data rate increase. The mobile station increases the current reverse data rate to a data rate equal to or less than a maximum reverse data rate if the rate increase available information indicates that the reverse data rate increase is available, and transmits reverse data at the increased reverse data rate.

20 Claims, 4 Drawing Sheets

METHOD OF CONTROLLING REVERSE TRANSMISSION IN A MOBILE COMMUNICATION SYSTEM

PRIORITY

This application claims priority to an application entitled "Method of Controlling Reverse Transmission in a Mobile Communication System" filed in the Korean Industrial Property Office on Mar. 26, 2001 and assigned Serial No. 2001-15785, and an application entitled "Method of Controlling Reverse Transmission in a Mobile Communication System" filed in the Korean Industrial Property Office on May 4, 2001 and assigned Serial No. 2001-25348, the contents of each of which are hereby incorporated by reference.

BACKGROUND OF THE INVENTION

1. Field of the Invention

The present invention relates generally to a transmission controlling method in a mobile communication system, and in particular, to a method of controlling reverse transmission.

2. Description of the Related Art

With the phenomenal growth of mobile communication technology, many mobile communication systems have been proposed and are currently being tried in the field. These systems generally operate based on CDMA (Code Division Multiple Access), and a 1xEV-DO (1xEvolution-Data Only) system called HDR (High Data Rate) is designed to carry out high-rate dedicated data transmission.

Similarly to other systems, 1xEV-DO systems also require appropriate scheduling to efficiently transmit packet data on the forward and reverse links. "The forward link" is a link directed from a base station to an access terminal (AT) or mobile station, and "a reverse link" is the opposite link directed from an AT to a base station. For forward data transmission, the base station transmits data to a particular AT attempting to utilize the best channel conditions available, considering the air link quality status between the base station and 1xEV-DO ATs, and other environments, resulting in a maximized data transmission throughput for the AT. Concerning reverse data transmission, a plurality of ATs access the base station simultaneously. In this situation, the base station must control overload within the reverse link channel capacity by controlling congestion and data flows from the ATs.

Besides the 1xEV-DO systems, other mobile communication systems designed to support multimedia service must also manage reverse data transmission efficiently. In doing so, system performance and capacity must be ensured.

In the existing 1xEV-DO systems, an AT carries out reverse data transmission based on a RAB (Reverse Activity Bit) and a ReverseRateLimit (RRL) message received from a base station, and reports to the base station its variable data rate via an RRI (Reverse Rate Indicator). The RRI indicates to the base station at what data rate the reverse traffic data is being sent. The base station transmits the time-multiplexed channels to the AT: a forward MAC (Medium Access Control) channel, a pilot channel, an FAB (Forward Activity Bit) channel and a RAB channel. The RAB represents the degree of congestion of the reverse link, and a data rate available to the AT varies according to the RAB. The base station controls a data flow from the AT by commanding an increase/decrease in the reverse data rate using the RAB to thereby control overload and capacity of the reverse link.

Since the RAB is broadcast to a plurality of ATs, the ATs receiving the RAB double their data rates or reduce them by half uniformly according to the RAB. The transmission time (or transmission period) of the RAB is determined by $$T \bmod RABlength \tag{1}$$

where T is system time and RABlength is the length of the RAB expressed in the number of slots. Table 1 below lists binary values representing RAB lengths. The base station transmits one of the binary values to the ATs and then the ATs calculate a slot time. The ATs receive the RAB on a forward MAC channel (F-MAC channel) using the received RABlength information and the system time.

TABLE 1

| Binary | Length (slots) |
|--------|----------------|
| 00     | 8              |
| 01     | 16             |
| 10     | 32             |
| 11     | 64             |

With the RAB transmitted from the base station to the ATs at the time calculated by equation (1), the ATs determine whether to increase or decrease their data rates for the current reverse transmission.

Despite a data rate increase command from the RAB, the highest data rates the ATs may transmit at may be limited by an RRL message received from the base station. The data rate can also be limited by the transmission power of the ATs. As a result, the ATs do not increase their data rates, wasting radio resources. Although an AT requests a much higher data rate to transmit an increased amount of data, its data rate is increased by a mere one unit because the RAB supports a gradual data rate increase/decrease. Accordingly, the base station must know the status of the ATs for efficient use of radio resources. This implies that the ATs should report their status to the base station. Unfortunately, neither the existing 1xEV-DO systems nor currently proposed mobile communication systems do not provide such functionality.

FIG. 1 is a flowchart illustrating a reverse data rate controlling procedure for an AT in an existing 1xEV-DO system.

The AT sets its lowest available data rate at an initial reverse data transmission. If the current data rate is less than a data rate provided in an RRL message received from a base station, the AT transmits data at the provided data rate after 32 slots (53.33 ms). On the other hand, if the current data rate is greater than the provided data rate, the AT transmits data at the provided data rate. For the subsequent reverse transmission, the AT determines its data rate by the procedure of FIG. 1. The RRL message is transmitted to the AT to determine an initial reverse data rate and reset the reverse data rate.

After determining its data rate, the AT reports its data rate to the base station by an RRI symbol as shown in Table 2. The reverse data rate is selected among 4.8, 9.6, 19.2, 38.4, 76.8 and 153.6 kbps. This reverse data rate is reset by a message such as an RRL message or an RAB message received from the base station. Table 2 below lists RRI mappings in the 1xEV-DO system.

TABLE 2

| Data rate (kbps) | RRI symbol |
|---|---|
| 4.8 | 001 |
| 9.6 | 010 |
| 19.2 | 011 |
| 38.4 | 100 |
| 76.8 | 101 |
| 153.6 | 110 |

To aid the AT in resetting its data rate, the base station must transmit to the AT an RRL message of the structure shown in Table 3.

TABLE 3

| Field | Length (bits) |
|---|---|
| Message ID | 8 |
| 29 occurrences of the following two fields | |
| RateLimitIncluded | 1 |
| RateLimit | 0 or 4 |
| Reserved | Variable |

Upon receipt of the RRL message, the AT resets the reverse data rate by comparing the current reverse data rate with a data rate set in the RRL message. 29 records may be inserted in the above RRL message and each record indicates a data rate assigned to a corresponding MACindex among MACindexes 3 to 31. In Table 3, Message ID indicates the ID of the RRL message. RateLimitIncluded is a field indicating whether RateLimit is included in the RRL message. If RateLimit is included, RateLimitIncluded is set to 1 and otherwise, it is set to 0. RateLimit indicates a data rate assigned to a corresponding AT. The base station assigns data rates shown in Table 4 to ATs using four bits.

TABLE 4

| 0 × 0 | 4.8 kbps |
|---|---|
| 0 × 1 | 9.6 kbps |
| 0 × 2 | 19.2 kbps |
| 0 × 3 | 38.4 kbps |
| 0 × 4 | 76.8 kbps |
| 0 × 0 | 153.6 kbps |
| All other values are invalid | |

During reverse data transmission, the AT monitors a F-MAC (Forward Medium Access Control) channel from the base station, especially the RAB on the F-MAC channel and adjusts its current data rate by performing a persistence test.

Referring to FIG. 1, the AT monitors the RAB of a F-MAC channel from a base station included in the active set of the AT in step 100 and determines whether the RAB is equal to 1 in step 102. If the AT has six sectors/base stations in its active set, the AT determines whether at least one of the RABs of the F-MAC channels received from the six sectors/base stations is equal to 1. If at least one RAB is equal to 1, the AT proceeds to step 112, otherwise, the procedure goes to step 104.

The case that all RABs=0 will first be considered.

If the RAB is 0, the AT performs a persistence test in step 104. The persistence test is available when the base station broadcasts the RAB to a plurality of ATs to control the amount of reverse data from the ATs. The persistence test passes or fails depending on whether a generated random number satisfies a desired condition.

If the persistence test passes in step 104, the AT increases its data rate (TX rate) in step 106. On the contrary, if the persistence test fails, the AT jumps to step 120. The AT increases the TX rate in step 106 and compares the increased TX rate with a maximum allowed data rate (a max TX rate) in step 108. If the increased TX rate is greater than the max TX rate, the AT sets the TX rate to the max TX rate in step 110 and goes to step 120.

Now, the case that at least one RAB=1 will be considered.

If the RAB is equal to 1 in step 102, the AT performs a persistence test in step 112. If the persistence test fails, the AT jumps to step 120. If the persistence test passes, the AT decreases the TX rate in step 114 and compares the decreased TX rate with a minimum data rate (a min TX rate) in step 116. If the decreased TX rate is less than the min TX rate, the AT goes to step 118, otherwise, it jumps to step 120. The AT sets the TX rate to the min TX rate in step 118 and goes to step 120. The min TX rate can be a default data rate of 9.6 kbps or a data rate designated at a call connection.

In step 120, the AT generates an RRI symbol corresponding to the set TX rate. The AT transmits the AT along with traffic data only if a traffic connection is opened between the base station and the AT. If the traffic connection is not opened, the AT transmits only the RRI symbol.

FIG. 2 is a diagram illustrating data transmission/reception between an AT and an HDR sector included in the active set of the AT. As seen from FIG. 2, F- and R-traffic channels and F- and R-MAC channels have been established between the AT and sector 1 with a connection opened between them. F denotes forward direction and r denotes reverse direction. No F-traffic channels are assigned to the AT from sector 2 through n with no connection opened between them. In the 1×EV-DO system, the AT can maintain up to six sectors/base stations in its active set. Therefore, the AT monitors F-MAC channels from all the sectors of the active set, especially RABs on the F-MAC channels to determine its TX rate.

Upon receipt of at least one RAB set to 1, the AT performs a persistence test to decrease its TX rate. In the persistence test, the AT generates a random number and compares it with a persistence vector defined by the base station at or during a connection. If the random number satisfies a desired condition, the AT determines that the persistence test passes. The AT then decreases the TX rate by half. On the contrary, if the persistence test fails, the AT maintains the TX rate. If the TX rate is less than a min TX rate, the AT sets the TX rate at the min TX rate. Meanwhile, if all the RABs are equal to 0 and a persistence test passes, the TX rate is doubled. If the persistence test fails, the AT maintains the TX rate. If the TX rate becomes greater than a max TX rate, the AT sets the TX rate to the max TX rate. Also, in the case where the AT is limited in transmission power, it maintains the TX rate. The RAB that functions to double a reverse data rate or reduces it by half is broadcast to ATs in TDM with an FAB on a forward common channel, a F-MAC channel. The ATs increase/decrease their data rates uniformly according to the RAB.

From the system's perspective, the above-described reverse transmission controlling method for the current 1×EV-DO systems simplifies bandwidth control and overhead control. However, the uniform control without considering the individual status of ATs brings about a bandwidth waste and decreases the data transmission efficiency of the ATs. Accordingly, the base station should consider the status of the ATs in controlling their data rates to save bandwidth and provide transmission efficiency. The currently proposed mobile communication systems as well as the 1×EV-DO system all exhibit these problems.

SUMMARY OF THE INVENTION

It is, therefore, an object of the present invention to provide a method of transmitting mobile station status information from a mobile station to a base station.

It is another object of the present invention to provide a method for efficiently using a reverse link based on mobile status information.

It is a further object of the present invention to provide a method of transmitting mobile status information with less overhead from a mobile station to a base station.

The foregoing and other objects of the present invention are achieved by providing a reverse transmission controlling method in a mobile communication system. According to one embodiment of the present invention, after receiving forward information commanding the increase or decrease of the reverse data rate received on a forward control channel from a base station, a mobile station determines whether the previous rate increase available information transmitted to the base station on a reverse control channel before reception of the forward information indicates that a reverse data rate increase is available, if the forward information commands a reverse data rate increase. The mobile station increases the current reverse data rate to a data rate equal to or less than a maximum reverse data rate if the rate increase available information indicates that the reverse data rate increase is available, and transmits reverse data at the increased reverse data rate.

The mobile station transmits information representing the increased data rate during transmission of the reverse data. The mobile station also sets rate increase available information by determining whether the increased reverse data rate can be increased and transmits the set rate increase available information on a reverse control channel.

The rate increase available information is set to indicate that a reverse data rate increase is not available if the current reverse data rate is equal to the maximum data rate, the amount of data stored in a buffer is at a threshold or less, or the mobile station is under the control of at least two sectors. If the transmission power of the mobile station is not enough to accommodate a data rate increase, the rate increase available information is set to indicate that a reverse data rate increase is not available.

If the previous rate increase available information indicates that a reverse data rate increase is available, the mobile station performs a persistence test. If the persistence test passes, the mobile station increases the current reverse data rate to a data rate equal to or less than the maximum data rate and transmits the reverse data at the increased data rate. On the other hand, if the previous rate increase available information indicates that a reverse data rate increase is not available, the mobile station maintains the current reverse data rate and transmits the reverse data at the current reverse data rate.

If the forward information commands a reverse data rate decrease, the mobile station decreases the current reverse data rate to a data rate equal to or greater than a minimum reverse data rate and transmits the reverse data at the decreased data rate. The reverse data rate is decreased only if a persistence test passes.

According to another embodiment of the present invention, after receiving rate increase available information from a mobile station, a base station determines a highest data rate for the mobile station through mobile station acquisition and characteristics analysis, generates a reverse data rate value, and transmits information representing the reverse data rate value to the mobile station. The base station also sets a reverse activity bit for the mobile station based on the received rate increase available information and the capacity of a reverse link and transmits the reverse activity bit to the mobile station.

If the mobile station transmits reverse data on at least two reverse links, the reverse activity bit is set by checking rate increase available information for each of the at least two reverse links. Here, a reverse activity bit can be set for each of the at least two reverse links.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
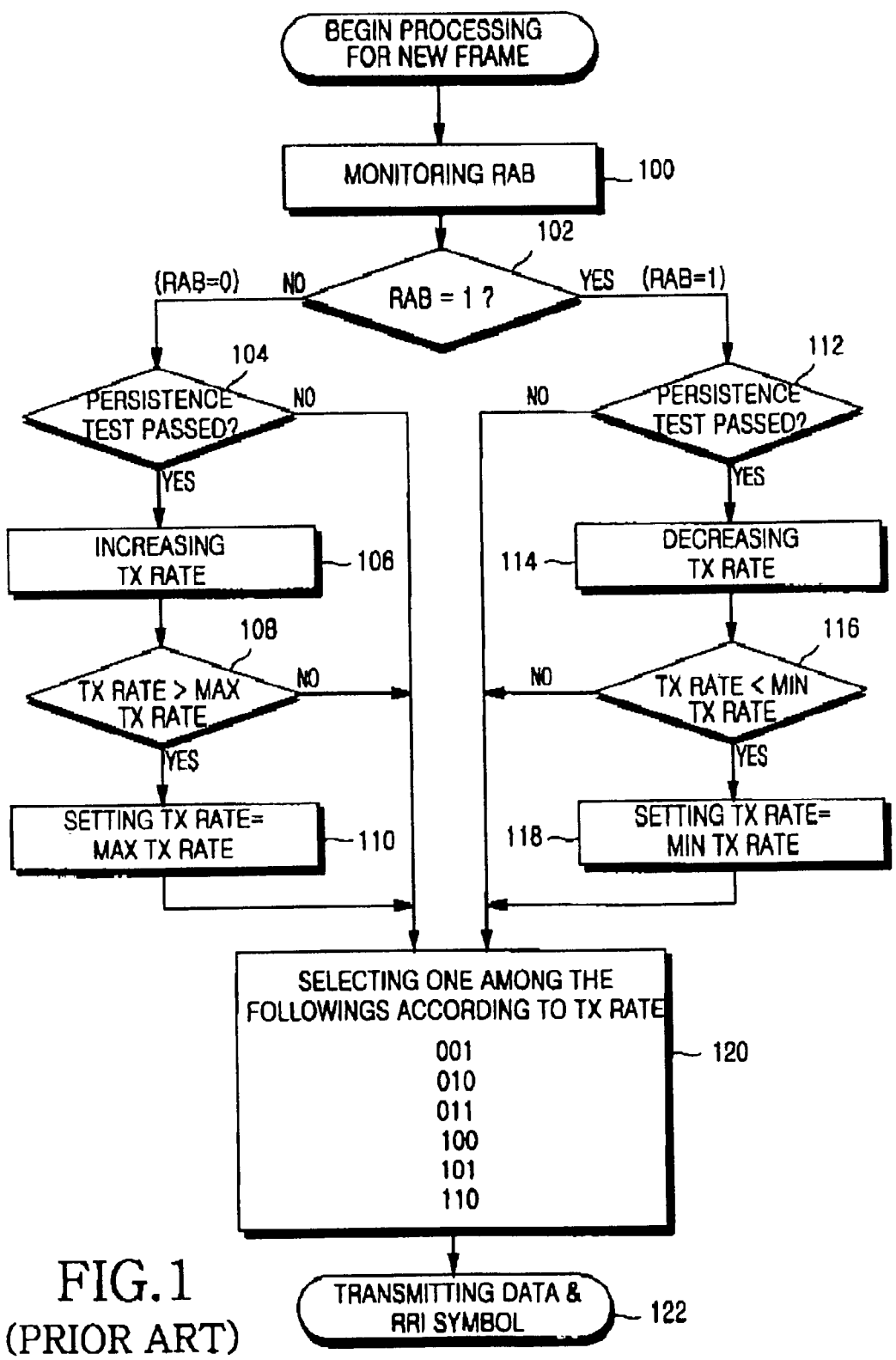
FIG. 1 is a flowchart illustrating a reverse data rate controlling method for a mobile station in a conventional mobile communication system.
Figure 2:
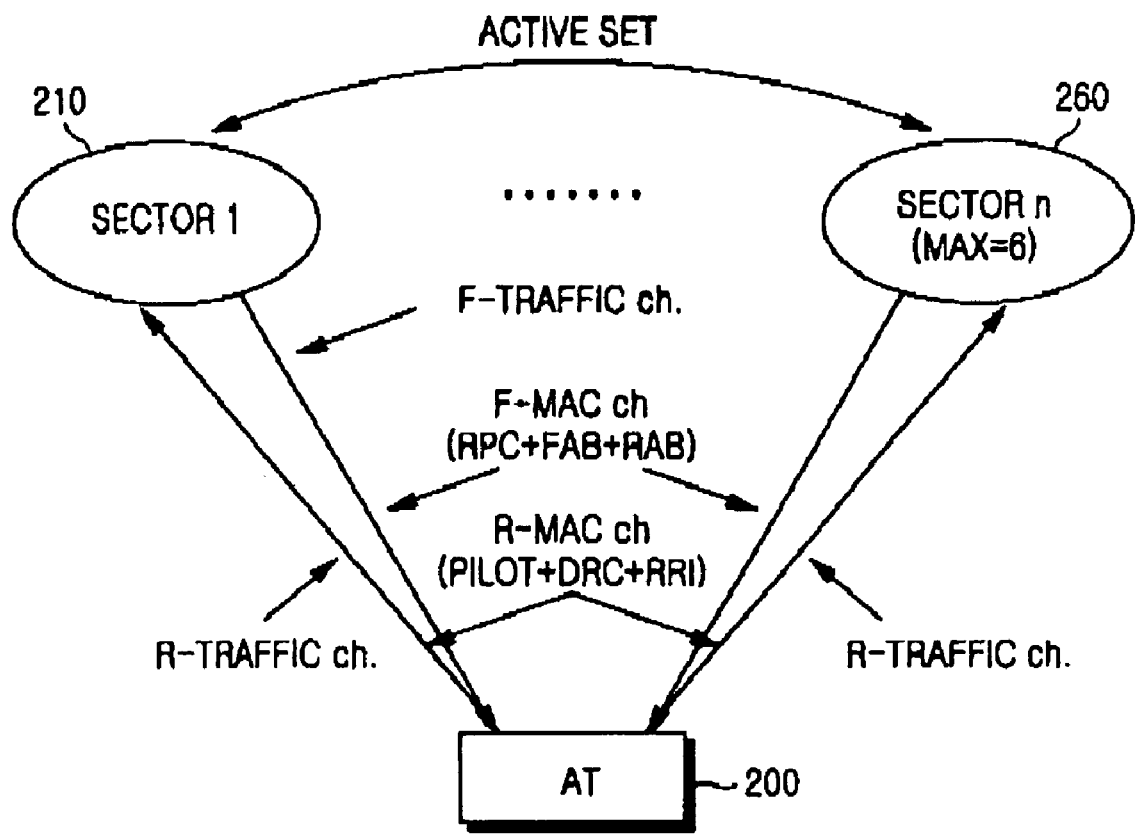
FIG. 2 is a diagram illustrating data transmission/reception between a mobile station and a sector included the active set of the mobile station.
Figure 3:
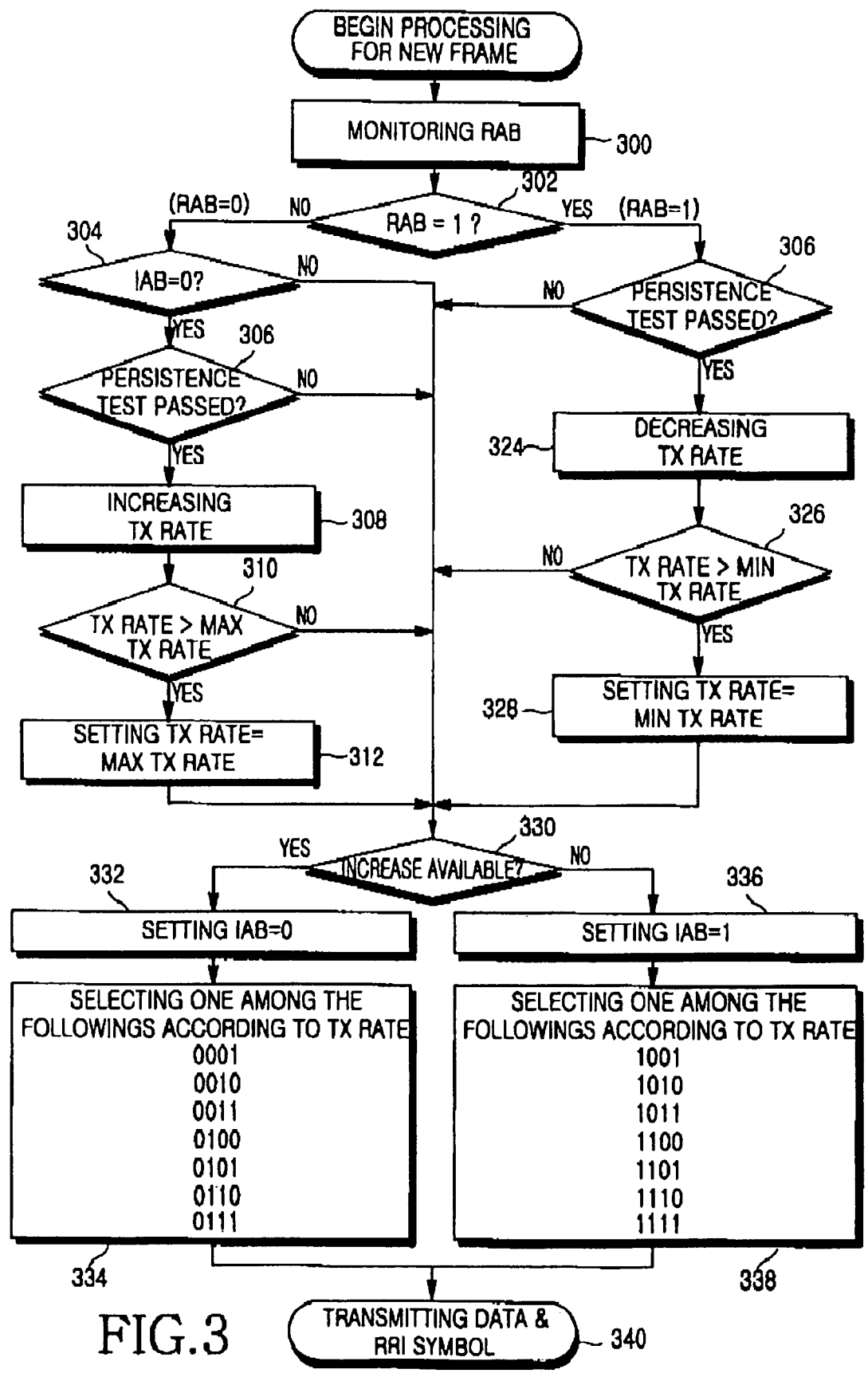
FIG. 3 is a flowchart illustrating a reverse data rate controlling method for a mobile station in a mobile communication system according to an embodiment of the present invention.

FIG. 3 is a flowchart illustrating a reverse data transmission controlling method for a mobile station in a mobile communication system according to an embodiment of the present invention.

Before describing the reverse data rate control method, a description will first be made of an RRI symbol representing the status of a mobile station according to the present invention. The conventional RRI is modified to meet the requirement of minimizing the overhead of reporting the status of a mobile station. The modified RRI is configured as shown in Table 5.

TABLE 5

| Data rate (kbps) | RRI symbol (IAB = 0) Increase Enable | RRI symbol (IAB = 1) Increase Disable |
| --- | --- | --- |
| 0 | 0000 | N/A |
| 9.6 | 0001 | 1001 |
| 19.2 | 0010 | 1010 |
| 38.4 | 0011 | 1011 |
| 76.8 | 0100 | 1100 |
| 153.6 | 0101 | 1101 |
| 307.2 | 0110 | 1110 |
| 614.4 | 0111 | 1111 |
| 1024 | N/A | 1000 |

The mobile station reports its TX rate to the base station by the modified RRI shown in Table 5 according to the embodiment of the present invention. The base station uses the RRI symbol as information by which reverse data is recovered. The RRI is designed to accommodate data rates defined in the current mobile communication systems. The RRI, which is an expansion of the conventional RRI, includes an IAB (Increase Available Bit) in its first field to indicate to the base station whether the mobile station can increase its data rate.

The IAB is set to 1 if the mobile station cannot increase its TX rate if (1) the current TX rate of the mobile station is a maximum allowed data rate, (2) the amount of data stored in a buffer is at a threshold or below, or (3) the mobile station is under the control of at least two sectors. If the mobile station can increase its TX rate, the IAB is set to 0.

The mobile station preserves the IAB and adjusts its TX rate for the next frame according to the IAB and a RAB received from the base station. The above-described RRI is termed a first expanded RRI. The reverse transmission controlling method using the first expanded RRI will be described below referring to FIG. 3.

As stated before, the mobile station can maintain up to six sectors/base stations in its active set and monitors F-MAC channels in each frame received from the active set. An active set refers to a set of sectors/base stations serving the mobile station. If a connection is opened for transmission of traffic data between the mobile station and a base station in the active set, the base station assigns F- and R-traffic channels and a reverse power control channel (R-PCCH) to the mobile station. On the contrary, if a connection is not opened between them, the mobile station monitors only a control channel from the base station.

Referring to FIG. 3, the mobile station monitors the RAB of a F-MAC channel from each base station included in its active set in step 300 and determines whether the RAB is equal to 1 in step 302. If the mobile station has six sectors/base stations in its active set, it determines whether at least one of the RABs of F-MAC channels received from the six sectors/base stations is equal to 1. If at least one RAB is equal to 1, the mobile station proceeds to step 306, otherwise, it goes to step 304.

The case that all RABs=0 will first be considered.

If the RAB is 0, the mobile station checks the IAB of a first expanded RRI symbol representing the previous TX rate reported to the base station in order to determine whether it can increase its TX rate in step 304. If the IAB is 0, which implies that the mobile station can increase its TX rate, it goes to step 306, otherwise, it jumps to step 330. In step 306, the mobile station performs a persistence test. As stated before, the persistence test is used when the base station broadcasts the RAB to a plurality of mobile stations to control the amount of reverse data. In other words, no persistence test is carried out when the base station controls the reverse data rates individually. The persistence test passes or fails depending on whether a generated random number satisfies a desired condition.

If the persistence test passes, the mobile station increases its TX rate in step 308. On the contrary, if the persistence test fails, the mobile station jumps to step 330. The mobile station increases the TX rate in step 308 and compares the increased TX rate with a max TX rate in step 310. If the increased TX rate is greater than the max TX rate, the mobile station sets the TX rate to the max TX rate in step 312 and goes to step 330. If the TX rate is not greater than the max TX rate in step 310, the procedure proceeds to step 330.

Now, the case that at least one RAB=1 will be considered. If the RAB is equal to 1 in step 302, the mobile station performs a persistence test in step 320. If the persistence test passes, the mobile station decreases its current TX rate in step 324. If the persistence test fails, the mobile station jumps to step 330. The mobile station compares the decreased TX rate with a min TX rate in step 326. If the decreased TX rate is less than the min TX rate, the mobile station goes to step 328, otherwise, it jumps to step 330. The mobile station sets the TX rate to the min TX rate in step 328 and goes to step 330. The min TX rate can be a default rate of 9.6 kbps or a data rate designated by some message at a call connection.

In step 330, the mobile station determines whether a TX rate increase is available. A TX rate increase is available only if none of the aforementioned conditions that forbid a TX rate increase are satisfied. If a TX rate increase is available, the mobile station goes to step 332, otherwise, it goes to step 336. The mobile station sets an IAB to 0 in step 332 and selects a first expanded RRI symbol corresponding to the set TX rate referring to Table 5, for example, in step 334. In step 340, the mobile station transmits reverse data along with the first expanded RRI symbol. The data transmission is carried out with a traffic connection opened between the mobile station and the base station. If the traffic connection is not opened yet, the mobile station transmits only the first expanded RRI symbol to the base station.

If a TX rate increase proves not to be available in step 330, the mobile station sets the IAB to 1 in step 336, selects a first expanded RRI symbol corresponding to the set data rate in step 338, and transmits reverse data along with the first expanded RRI symbol in step 340. Similarly, the data transmission is carried out with a traffic connection opened between the mobile station and the base station. If the traffic connection is not opened yet, the mobile station transmits only the first expanded RRI symbol to the base station.

Figure 4:
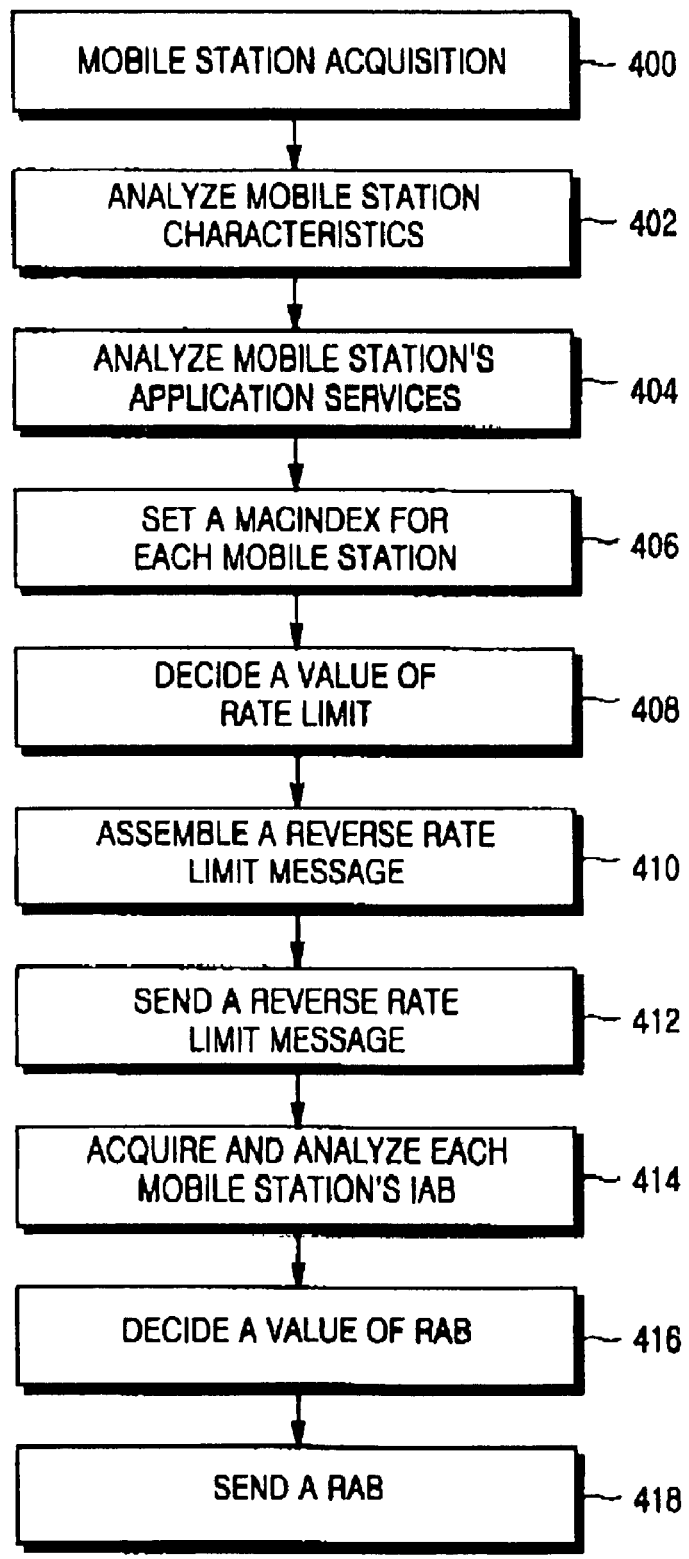
FIG. 4 is a flowchart illustrating a reverse data rate controlling method for a base station in the mobile communication system according to the embodiment of the present invention.

FIG. 4 is a flowchart illustrating a reverse transmission controlling method for a base station in the mobile communication system according to the embodiment of the present invention.

Referring to FIG. 4, upon receipt of a connection open request from the mobile station, the base carries out mobile station acquisition in step 400 and analyses the characteristics of the mobile station in step 402. In step 404, the base station analyses the characteristics of reverse traffic received from the mobile station, that is, determines the quality of a packet data service requested by the mobile station based on the particular application. In steps 406 and 408, the base station sets a MAC index and a value of RateLimit for an RRL message based on the analyzed characteristics of the mobile station and the application service. RateLimit is a field that assigns a reverse data rate to the mobile station. The base station assembles the RRL message with Message ID and other related message fields for transmission in the air in step 410. In step 412, the base station broadcasts the RRL message on a forward control channel, that is, on a forward common channel, or transmits it on a traffic channel.

Meanwhile, the base station receives the IAB of a first expanded RRI symbol in each frame from mobile stations. Thus, the base station acquires and analyses an IAB from each mobile station in step 414 and determines an RAB in step 416 to be transmitted next time based on the current available reverse channel capacity and the IABs from the mobile stations. Here, the base station knows the number of mobile stations capable of increasing their TX rates based on the IABs. Based on the number of those mobile stations, the base station can efficiently set the RAB within the reverse link capacity. In the case where the base station controls a plurality of mobile stations, the mobile stations perform persistence tests to determine whether to increase or decrease their TX rates. Therefore, the base station should determine the RAB considering the overall channel environment, the number of mobile stations within its coverage area, and the TX rates of each of the mobile stations. If a RAB is broadcast to mobile stations, it then implies that the RAB applies commonly to them.

On the other hand, if the base station controls the mobile station individually, it generates a RAB for each mobile station considering the type and priority level of serviced data and the status of the reverse link. Use of the RAB enables the base station to efficiently control the reverse TX rate of the mobile station, so that the use efficiency of the reverse link is increased. In step 418, the base station transmits the generated RAB.

While the embodiment of the present invention has been described in the context that one mobile station uses one radio traffic channel, it can be further contemplated that one mobile station uses at least two radio traffic channels. The use of at least two traffic channels in one mobile station can be considered in four ways: one common RAB and one common IAB; one common RAB and an IAB for each traffic channel; an RAB for each traffic channel and one common IAB; and an RAB and IAB for each traffic channel.

Use of One Common RAB and One Common IAB for Traffic Channels

If one mobile station uses at least two traffic channels, the reverse data transmission control can be carried out such that the base station applies one RAB commonly to the traffic channels and the mobile station inserts one IAB indicating whether a reverse TX rate increase is available in an RRI symbol representing the data rates of the different traffic channels. This RRI is termed a second expanded RRI. The second expanded RRI can be structured in two ways, which will be described later.

The reverse traffic channels experience the same increase, maintenance, and decrease in their reverse data rates when they are controlled by one RAB. An IAB may be located in one bit position, for example, the MSB (Most Significant Bit) of a second expanded RRI symbol and the other bits are assigned to represent the data rates of the reverse traffic channels.

For example, the first bit of a 7-bit RRI symbol is assigned as an IAB and the remaining six bits are equally separated to indicate the data rates of two reverse traffic channels, respectively. In this case, the second expanded RRI symbol is expressed as $$\text{IAB+data rate of first reverse channel (3 bits)+data rate of second reverse channel (3 bits)} \quad (2)$$

The data rate information of the RRI symbol is structured as a code comprising a series of concatenated data rates, wherein the code corresponds to the expression $$\text{IAB } X_1 X_2 \ldots X_n \quad (3)$$

where $X_1$ is a data rate of a first reverse channel, $X_2$ is a data rate of a second reverse channel, and $X_n$ is a data rate of an nth reverse channel.

In a different manner, the second expanded RRI symbol can be constructed as shown in Table 6. Table 6 lists mappings of data rates in combination to 7-bit RRI symbols.

TABLE 6

| Data rate (kbps) | | RRI symbol | |
| --- | --- | --- | --- |
| | | Increase Enable | Increase Disable |
| R-SCH 1 | R-SCH 2 | (IAB = 0) | (IAB = 1) |
| 0 | 0 | 0000000 | N/A |
| 0 | 9.6 | 0000001 | 1000001 |
| 0 | 19.2 | 0000010 | 1000010 |
| 0 | 38.4 | 0000011 | 1000011 |
| 0 | 76.8 | 0000100 | 1000100 |
| 0 | 153.6 | 0000101 | 1000101 |
| 0 | 307.2 | 0000110 | 1000110 |
| 0 | 614.4 | 0000111 | 1000111 |
| 9.6 | 0 | 0001000 | 1001000 |
| 9.6 | 9.6 | 0001001 | 1001001 |
| 9.6 | 19.2 | 0001010 | 1001010 |
| 9.6 | 38.4 | 0001011 | 1001011 |
| 9.6 | 76.8 | 0001100 | 1001100 |
| 9.6 | 153.6 | 0001101 | 1001101 |
| 9.6 | 307.2 | 0001110 | 1001110 |
| 9.6 | 614.4 | 0001111 | 1001111 |
| 1024 | 307.2 | N/A | 1000000 |
| . | . | . | . |
| . | . | . | . |
| . | . | . | . |

Such a table as Table 6 is provided to both the mobile station and the base station. Each RRI symbol listed in Table 6 can be expressed as $$\text{IAB+data rates of first and second reverse channels in combination (6 bits)} \quad (4)$$

For a second expanded RRI symbol of "0001010", the mobile station can increase its TX rate due to the IAB=0. The other six bits "001010" represent the data rates of 9.6 kbps and 19.2 kbps, respectively for two traffic channels. For a second expanded RRI symbol of "1001010", the mobile station cannot increase its TX rate due to the IAB=1. The other six bits "001010" represent the data rates of 9.6 kbps and 19.2 kbps, respectively for two traffic channels. As seen from Table 6, the data rates of the reverse traffic channels are expressed in six bits.

Use of One Common RAB and an IAB for Each Traffic Channel

If one mobile station uses at least two traffic channels, the reverse transmission control can be carried out using one RAB commonly for the traffic channels and an IAB for each of them. In this case, an RRI symbol is structured to contain at least two IABs and bits representing the data rates of the traffic channels. This RRI is termed a third expanded RRI. The third expanded RRI can also be generated in two ways, Though the two reverse traffic channels are commonly controlled by one RAB, an IAB is independently set for each traffic channel. Therefore, the data rate of each traffic channel is changed independently. Two bits of an 8-bit third expanded RRI symbol are assigned as IABs and the other six bits are equally separated to represent the data rates of the two traffic channels respectively, by equation (2).

Alternatively, the third expanded RRI symbol can be structured by equation (3) such that the six bits remaining from assigning two bits to the IABs represent the data rates of the traffic channels in combination. The RRI mappings are given in Table 7.

TABLE 7

| Data Rate (kbps) | | RRI symbol | | | |
|---|---|---|---|---|---|
| | | IAB 1 = 0 | IAB 1 = 0 | IAB 1 = 1 | IAB 1 = 1 |
| R-SCH 1 | R-SCH 2 | IAB 2 = 0 | IAB 2 = 1 | IAB 2 = 0 | IAB 2 = 1 |
| 0 | 0 | 00000000 | N/A | N/A | N/A |
| 0 | 9.6 | 00000001 | 01000001 | 10000001 | 11000001 |
| 0 | 19.2 | 00000010 | 01000010 | 10000010 | 11000010 |
| 0 | 38.4 | 00000011 | 01000011 | 10000011 | 11000011 |
| 0 | 76.8 | 00000100 | 01000100 | 10000100 | 11000100 |
| 0 | 153.6 | 00000101 | 01000101 | 10000101 | 11000101 |
| 0 | 307.2 | 00000110 | 01000110 | 10000110 | 11000110 |
| 0 | 614.4 | 00000111 | 01000111 | 10000111 | 11000111 |
| 9.6 | 0 | 00001000 | 01001000 | 10001000 | 11001000 |
| 9.6 | 9.6 | 00001001 | 01001001 | 10001001 | 11001001 |
| 9.6 | 19.2 | 00001010 | 01001010 | 10001010 | 11001010 |
| 9.6 | 38.4 | 00001011 | 01001011 | 10001011 | 11001011 |
| 9.6 | 76.8 | 00001100 | 01001100 | 10001100 | 11001100 |
| 9.6 | 153.6 | 00001101 | 01001101 | 10001101 | 11001101 |
| 9.6 | 307.2 | 00001110 | 01001110 | 10001110 | 11001110 |
| 9.6 | 614.4 | 00001111 | 01001111 | 10001111 | 11001111 |
| 1024 | 307.2 | N/A | N/A | N/A | 11000000 |
| . | . | . | . | . | . |
| . | . | . | . | . | . |
| . | . | . | . | . | . |

In Table 7, the first and second fields of a third expanded RRI are assigned as IABs for the first and second traffic channels, respectively, and the other six bits represent their data rates in combination. For example, if a third expanded RRI symbol is "00001010", this implies that the mobile station can increase both the two data rates and the two data rates are 9.6 kbps and 19.2 kbps, respectively.

For a third expanded RRI symbol of "01001010", the mobile station can increase the data rate of the first traffic channel only, and the two data rates are 9.6 kbps and 19.2 kbps, respectively. For a third expanded RRI symbol of "10001010", the mobile station can increase the data rate of the second traffic channel only, and the two data rates are 9.6 kbps and 19.2 kbps, respectively. For a third expanded RRI symbol of "11001010", the mobile station cannot increase either of the data rates of the first and second traffic channels, and the two data rates are 9.6 kbps and 19.2 kbps, respectively.

Use of an RAB for Each Reverse Traffic Channel and One Common IAB

In this case, the data rates of the traffic channels can be changed independently of each other. A 7-bit RRI symbol is configured as shown in Table 6 or by equation (2). That is, the second expanded RRI symbol is adopted.

Use of an RAB and an IAB for Each Reverse Traffic Channel

An RAB and an IAB can be provided for each of the traffic channels. In this case, an 8-bit RRI symbol is produced as shown in Table 7. Or the 8-bit RRI symbols is configured such that two IAB fields are set and the other six bits are equally separated to represent the data rates of the traffic channels.

Assignment of an RAB and an IAB for each of the reverse traffic channels enables separate control of the reverse traffic channels.

The IAB may be transmitted on a channel other than an RRI channel, such as a RICH (Rate Indicator Channel). Or a novel channel can be defined to transmit the IAB. It is ideal that the transmission period of the IAB is set on a frame basis, but it may also be set arbitrarily.

While the embodiment of the present invention has been described dealing with one or two reverse traffic channels, the number of reverse traffic channels is not limited in implementing the present invention. Also, the data rate of each reverse traffic channel can be represented in four or more bits according to the number of data rates while three bits are assigned to represent it in the present invention.

As described above, the mobile station reports its status to the base station its status and the base station controls reverse transmission based on the status information. Therefore, the use efficiency of the reverse link is improved. Moreover, use of an expanded RRI in a mobile status message minimizes overhead.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of controlling a reverse data rate in a mobile station receiving a forward information commanding an increase or decrease of the reverse data rate received on a forward channel from a base station, comprising the steps of:
    determining whether a previous rate increase available information transmitted to the base station on a reverse channel before reception of the forward information indicates that the reverse data rate increase is available, if the forward information commands the reverse data rate increase; and
    increasing the current reverse data rate to a data rate equal to or less than a maximum reverse data rate if the rate increase available information indicates that the reverse data rate increase is available, and transmitting reverse data at the increased reverse data rate.

2. The method of claim 1, further comprising the step of transmitting reverse rate information on a reverse channel when the reverse data is transmitted.

3. The method of claim 2, wherein when the reverse data is transmitted on at least two channels, reverse rate information of the at least two channels is transmitted.

4. The method of claim 2, wherein the forward information is transmitted independently to each mobile station.

5. The method of claim 1, further comprising the step of setting rate increase available information by determining whether the reverse data rate can be increased and transmitting the set rate increase available information on a reverse channel.

6. The method of claim 5, wherein the set rate increase available information is set to indicate that a reverse data rate increase is not available if at least one of a current reverse data rate is equal to the maximum data rate, the amount of data stored in buffer is at a threshold or less, and the mobile station is under the control of at least two sectors.

7. The method of claim 5, wherein the set rate increase available information is set to indicate that a reverse data rate increase is not available if the maximum transmission power of the mobile station is less than an amount required to accommodate a data rate increase.

8. The method of claim 5, wherein if the set reverse data is transmitted on at least two channels, the rate increase available information is information representing whether the data rates of the at least two channels can be increased.

9. The method of claim 5, wherein if the set reverse data is transmitted on at least two channels, the rate increase available information is generated for each of the at least two traffic channels to indicate whether the data rate of each of the at least two the channels can be increased.

10. The method of claim 1, further comprising the steps of performing a persistence test if the previous rate increase available information indicates that a reverse data rate increase is available, increasing the current reverse data rate to a data rate equal to or less than the maximum data rate if the persistence test passes, and transmitting the reverse data at the increased data rate.

11. The method of claim 1, further comprising a step of decreasing the current reverse data rate to a data rate equal to or greater than a minimum reverse data rate if the forward information commands a reverse data rate decrease, and transmitting the reverse data at the decreased data rate.

12. The method of claim 1, wherein only if a persistence test passes, a current reverse data rate is decreased to the data rate equal to or greater than the minimum reverse data rate and the reverse data is transmitted at the decreased data rate.

13. The method of claim 1, wherein the forward information is transmitted equally to each mobile station.

14. A method of controlling a reverse data rate in a base station after receiving rate increase available information from a mobile station, comprising the steps of:
   checking a reverse data rate increase available information received from the mobile station and a capacity of a reverse link; and
   determining a forward information commanding increase or decrease of the reverse data rate based on the checked result and transmitting the determined forward information to the mobile station.

15. The method of claim 14, wherein if the mobile station transmits reverse data on at least two reverse links, a reverse activity bit is determined by checking data rate increase available information about each of the at least two reverse links.

16. The method of claim 14, wherein if the mobile station transmits reverse data on at least two reverse links, forward information is generated for each of the at least two reverse links.

17. The method of claim 14, wherein the forward information is transmitted equally to each mobile station.

18. The method of claim 14, wherein the forward information is transmitted independently to each mobile station.

19. An apparatus for controlling a reverse data rate in a mobile station receiving forward information commanding an increase or decrease of the reverse data rate received on a forward channel from a base station, comprising:
   a determining device for determining whether a previous rate increase available information transmitted to the base station on a reverse channel before reception of the forward information indicates that a reverse data rate increase is available, if the forward information commands a reverse data rate increase; and
   an increasing device for increasing the current reverse data rate to a data rate equal to or less than a maximum reverse data rate if the rate increase available information indicates that the reverse data rate increase is available, and transmitting reverse data at the increased reverse data rate.

20. An apparatus for controlling a reverse data rate in a base station after receiving rate increase available information from a mobile station, comprising:
   a checking device for checking a reverse data rate increase available information received from the mobile station and a capacity of a reverse link; and
   a determining device for determining the forward information representing increase or decrease of the reverse data rate of the mobile station based on the determined result and transmitting the determined forward information to the mobile station.

* * * * *